(12) United States Patent
Park

(10) Patent No.: US 12,155,503 B2
(45) Date of Patent: Nov. 26, 2024

(54) VEHICLE INNER COMMUNICATION SYSTEM AND VEHICLE INCLUDING SAME

(71) Applicant: LG INNOTEK CO., LTD., Seoul (KR)

(72) Inventor: Soo Young Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 283 days.

(21) Appl. No.: 17/637,629

(22) PCT Filed: Sep. 9, 2020

(86) PCT No.: PCT/KR2020/012188
§ 371 (c)(1),
(2) Date: Feb. 23, 2022

(87) PCT Pub. No.: WO2021/049879
PCT Pub. Date: Mar. 18, 2021

(65) Prior Publication Data
US 2022/0278869 A1     Sep. 1, 2022

(30) Foreign Application Priority Data

Sep. 9, 2019   (KR) .......................... 10-2019-0111748

(51) Int. Cl.
*H04L 12/40* (2006.01)
*G06F 13/42* (2006.01)
*H04L 67/12* (2022.01)

(52) U.S. Cl.
CPC .......... *H04L 12/40* (2013.01); *G06F 13/4282* (2013.01); *H04L 67/12* (2013.01);
(Continued)

(58) Field of Classification Search
CPC ..................... H04L 12/40; H04L 67/12; H04L 2012/40215; H04L 2012/40273; G06F 13/4282
(Continued)

(56) References Cited

U.S. PATENT DOCUMENTS 10,805,398 B2 * 10/2020 Xu .......................... G08C 17/02
11,815,976 B2 * 11/2023 Selvam ............... G06F 13/4282
(Continued)

FOREIGN PATENT DOCUMENTS

| CN | 107561969 | 1/2018 |
|---|---|---|
| JP | 2003533915 | 11/2003 |

(Continued)

OTHER PUBLICATIONS

Chinese Office Action dated Oct. 19, 2023 issued in Application No. 202080064079.8.
(Continued)

*Primary Examiner* — Peter G Solinsky
(74) *Attorney, Agent, or Firm* — KED & ASSOCIATES, LLP

(57) ABSTRACT

A vehicle inner communication system according to one embodiment can comprise: a plurality of electronic device groups provided in a vehicle; and a control unit, which uses bus communication individually connected to the electronic devices within the electronic device group and series communication by which the electronic devices inside the electronic device group are connected, so as to sense electronic devices within the electronic device group and control operations.

20 Claims, 3 Drawing Sheets

(52) U.S. Cl.
CPC ............... *H04L 2012/40215* (2013.01); *H04L 2012/40273* (2013.01)

(58) Field of Classification Search
USPC ........................................................ 370/329
See application file for complete search history.

(56) References Cited

U.S. PATENT DOCUMENTS

| | | | |
|---|---|---|---|
| 2002/0188781 | A1 | 12/2002 | Schoch et al. |
| 2003/0043779 | A1 | 3/2003 | Remboski et al. |
| 2010/0088442 | A1 | 4/2010 | Kuschke |
| 2016/0190778 | A1* | 6/2016 | Yang ................... H02B 11/167 361/606 |
| 2017/0083468 | A1 | 3/2017 | Sengoku |
| 2018/0189483 | A1 | 7/2018 | Litichever et al. |
| 2019/0340363 | A1* | 11/2019 | Walrant .............. H04L 63/0263 |
| 2020/0301610 | A1* | 9/2020 | Shirakura ........... G06F 13/4282 |

FOREIGN PATENT DOCUMENTS

| | | |
|---|---|---|
| JP | 2007-093425 | 4/2007 |
| JP | 2009135693 | 6/2009 |
| JP | 2018107623 | 7/2018 |
| JP | 2018529170 | 10/2018 |
| KR | 10-2011-0085679 | 7/2011 |
| KR | 20160092718 | 8/2016 |
| KR | 101714474 | 3/2017 |
| KR | 10-2019-0060782 | 6/2019 |
| WO | WO 2018/213270 | 11/2018 |

OTHER PUBLICATIONS

European Search Report dated Oct. 5, 2022 issued in Application No. 20862086.4.
International Search Report dated Nov. 30, 2020 issued in Application No. PCT/KR2020/012188.
European Office Action dated Aug. 2, 2024 issued in Application No. 20 862 086.4.
Japanese Office Action dated Aug. 20, 2024 issued in Application No. 2022-515582.
Korean Office Action dated Sep. 11, 2024 issued in Application No. 10-2019-0111748.

* cited by examiner

VEHICLE INNER COMMUNICATION SYSTEM AND VEHICLE INCLUDING SAME

CROSS-REFERENCE TO RELATED PATENT APPLICATIONS

This application is a U.S. National Stage Application under 35 U.S.C. § 371 of PCT Application No. PCT/KR2020/012188, filed Sep. 9, 2020, which claims priority to Korean Patent Application No. 10-2019-0111748, filed Sep. 9, 2019, whose entire disclosures are hereby incorporated by reference.

TECHNICAL FIELD

The present invention relates to a vehicle inner communication system and vehicle including same, and more particularly, relates to a technology for efficiently performing communication between a main controller inside a vehicle and various modules installed inside the vehicle.

BACKGROUND ART

In modern society, automobiles are the most common means of transportation, and the number of people using automobiles is increasing. Owing to the development of automobile technology, many changes are taking place in life, such as making it easier to move long distances than in the past and making life easier.

For the convenience of the driver, many electronic devices such as hands-free devices, GPS receivers, Bluetooth devices, and high-pass devices are being developed inside vehicles, and among automobile-related technology fields, the proportion of electric and electronic fields creating new values is increasing.

Recently, many electronic device parts are mounted in automobiles, and many electronic device parts are being operated multiple times and simultaneously. In general, in such a case, one central electronic control unit (ECU) for a vehicle plays the role of managing and controlling these electronic parts at the same time.

However, in installing and controlling these electronic device components, since it is efficient to install and control similar types of electronic device components as a group, recently, attempts to diversify product groups by connecting devices such as a DC-DC converter or an oil circuit breaker (OCB) are actively being made.

However, in the case of adopting such a configuration, the central electronic control unit must be able to detect in real time whether various electronic device components connected to the central electronic control unit are operating correctly, however, in the case of the prior art, when a problem occurs in a portion of the communication line connected between the central electronic control device and the modules, thereby disabling communication, there is a problem that there is no way to accurately know this.

DETAILED DESCRIPTION OF THE INVENTION

Technical Subject

Accordingly, the present invention is an invention devised to solve the problems of the prior art as described above, an object thereof is to provide a vehicle inner communication system and vehicle including same in which a method of communication with electronic devices using a bus and a communication method of electronic devices connected in series by controlling electronic devices using both at the same time, so that when a problem occurs in one communication method, it is possible to control electronic devices using other methods of communication.

Technical Solution

A vehicle inner communication system according to one embodiment may comprise: a plurality of electronic device groups provided in a vehicle; and a control unit configured to detect electronic devices in the electronic device groups and control operation thereof, by using bus communication method, which send and receive signal individually with electronic devices in the electronic device groups, and serial communication method, which send and receive signal sequentially with electronic devices serially connected in the electronic device group.

The bus communication method may include at least one of a controller area network (CAN) communication method and an RS-485 communication method.

The serial communication method may include a method in which communication signals are sequentially transmitted through serially connected electronic devices.

The serial communication method may include at least one among a universal asynchronous receiver/transmitter (UART) communication method, an RS-232 communication method, an SPI communication method, and an I2C communication method.

The control unit sets IDs to the electronic devices inside the electronic device group using the serial communication method, and then may detect the electronic devices through the bus communication method using the IDs that has been set and control the operation thereof.

In the electronic device group, electronic devices of the same type may be grouped together.

Electronic devices in the electronic device group may transmit/receive signals to each other using the same type of communication method.

The electronic devices may include at least one among a DC-DC converter, a battery management system, and an oil circuit breaker (OCB).

The control unit may detect and control the electronic devices using another communication method that is operating normally when a problem occurs in the operation of any one of the bus communication method and the serial communication method.

A vehicle according to another embodiment may comprises: at least one of electronic device groups; and a control unit configured to detect electronic devices in the electronic device groups and control operation thereof, by using bus communication method individually connected to electronic devices in the electronic device group and serial communication method which the electronic devices in the electronic device group are connected each other.

Advantageous Effects

A vehicle inner communication system and vehicle including same according to an embodiment has an effect of reducing restrictions on arrangement positions of electronic devices by setting an ID to each of the electronic devices, which is a disadvantage of bus communication, by using serial-connected communication.

In addition, a vehicle inner communication system and vehicle including same according to an embodiment can continuously control electronic devices using another communication method even if operation is impossible due to a problem in one communication, and thus, there is an effect of achieving a higher safety rating for the vehicle by implementing dual communication from a functional safety point of view.

BEST MODE

Figure 1:
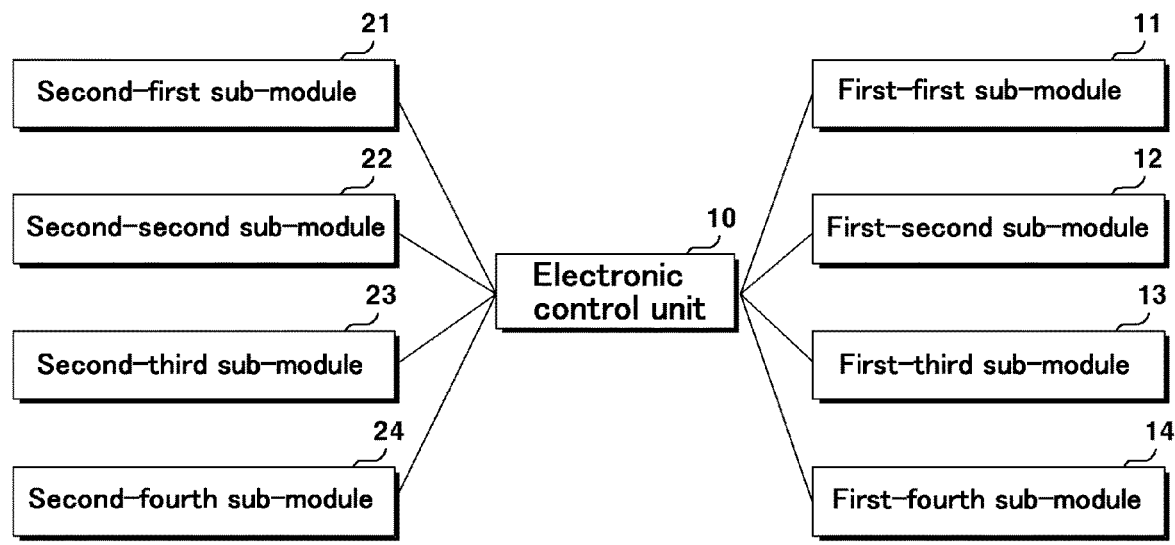
FIG. 1 is a block diagram illustrating a communication method inside a vehicle according to a prior art.

The configuration illustrated in the embodiments and drawings described in this specification are a preferred example of the disclosed invention, and there may be various modified embodiments that may replace the embodiments and drawings of the present specification at the time of filing of the present application.

In addition, the terms used in this specification are used to describe the embodiments, and are not intended to limit and/or restrict the disclosed invention. The singular expression includes the plural expression unless the context clearly dictates otherwise.

In the present specification, terms such as "comprises", "comprising" or "have" are intended to designate that the features, numbers, steps, operations, components, parts, or combinations thereof described in the specification exist, but does not preclude in advance the possibility of the presence or addition of one or more other features or numbers, steps, operations, components, parts, or combinations thereof, and terms including an ordinal number such as "first", "second", and the like used in this specification may be used to describe various components, but the components are not limited by the terms.

Hereinafter, with reference to the accompanying drawings, embodiments of the present invention will be described in detail so that those of ordinary skill in the art can easily carry out the present invention. And in order to clearly explain the present invention in the drawings, parts irrelevant to the description will be omitted.

Figure 2:
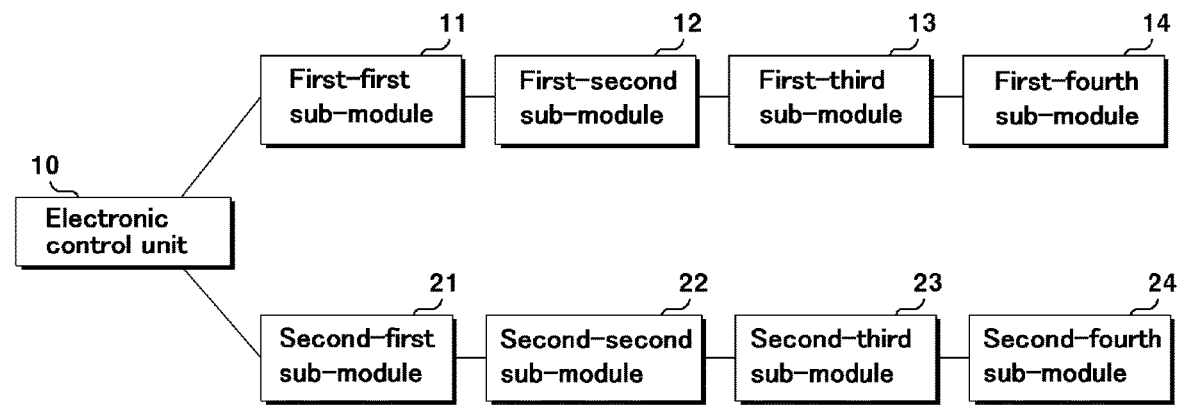
FIG. 2 is a block diagram for explaining a communication method inside a vehicle according to another prior art.

FIGS. 1 and 2 are block diagrams for explaining an inner vehicle communication method according to the prior art.

Many electronic device components are mounted on a vehicle for the operation of the vehicle and the convenience of the user, and the state of these electronic device components is detected through an electronic control unit (ECU), which is generally installed inside the vehicle, and operation is controlled at the same time.

And with the development of electronic technology, the number and types of electronic device components mounted on vehicles are increasing, and since managing all of these individually by the electronic control unit may result in an overload of the electronic control unit, there is a growing need for a method capable of efficiently managing these electronic devices.

Accordingly, in order for the electronic control unit of the vehicle to efficiently manage electronic device components mounted on the vehicle, it should be possible to determine in real time whether the transmission and reception of signals between the electronic control unit and the electronic devices are operating smoothly and without any problems, but in the case of prior art, since there is only one way of communication between the electronic control unit and the electronic devices, there has been a problem in which this could not be accurately determined.

Looking at this in detail, in the case of the prior art, as illustrated in FIG. 1, a structure is adopted, in which the electronic control unit 10 and a plurality of electronic devices installed in the vehicle individually transmit and receive signals.

Here, a first-first sub-module to a first-fourth sub-module 11, 12, 13, and 14 and a second-first sub-module to a second-fourth sub-module 21, 22, 23, and 24 mean a plurality of electronic devices; a first-first sub-module to a first-fourth sub-module 11, 12, 13, and 14 mean a group of the same type of electronic device; and a second-first sub-module to second-fourth sub-module 21, 22, 23, and 24 may mean another group of the same type of electronic device.

That is, in the case of the prior art, since the electronic control unit 10 controlled each of the sub-modules 11, 12, 13, 14, 21, 22, 23, and 24 in a way of transmitting and receiving signals individually with each of the sub-modules 11, 12, 13, 14, 21, 22, 23, and 24, there was a problem in that a sub-module in which communication is not established cannot be controlled when a problem occurred in one of the communication lines in which communication is not established.

In addition, in the case of the prior art, a structure as illustrated in FIG. 2 is adopted as another method, and in the case of the structure illustrated in FIG. 2, the electronic control unit 10 may sequentially transmit and receive signals to and from each of the sub-modules 11, 12, 13, 14, 21, 22, 23, and 24 rather than transmitting signals individually.

Specifically, in the case of such a communication method, electronic devices of the same type are sequentially connected to form a group, and communication is performed in such a way that a received signal is transmitted to the next serially connected module.

For example, communication takes place in a way that when the electronic control unit 10 transmits a signal A to a first-first sub-module 11; the first-first sub-module 11 receives it and then transmits the signal A to the next module which is a first-second sub-module 12; the first-second sub-module 12 transmits the signal A to a first-third sub-module 13; and the first-third sub-module 13 transmits the signal A to a first-fourth sub-module 14.

In the case of such a communication method, there is an advantage of being able to transmit and receive signals more efficiently as the modules of the same group are connected to each other, but as the number of connected modules increases, the communication time becomes longer, and when a problem occurs in any one communication line, there may be a problem in that communication to all modules connected in series becomes impossible.

Therefore, in the case of the vehicle inner communication system and vehicle including same according to an embodiment, it is to provide a method capable of stably enhancing the communication performance inside the vehicle while solving these problems. Hereinafter, it will be studied in detail through the drawings.

Figure 3:
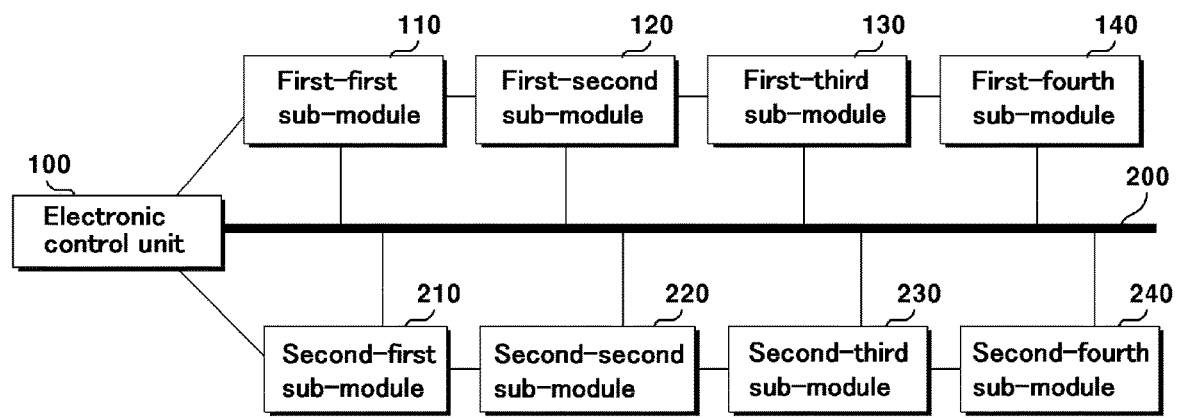
FIG. 3 is a block diagram illustrating a partial configuration of a vehicle inner communication system according to an embodiment.
Figure 4:
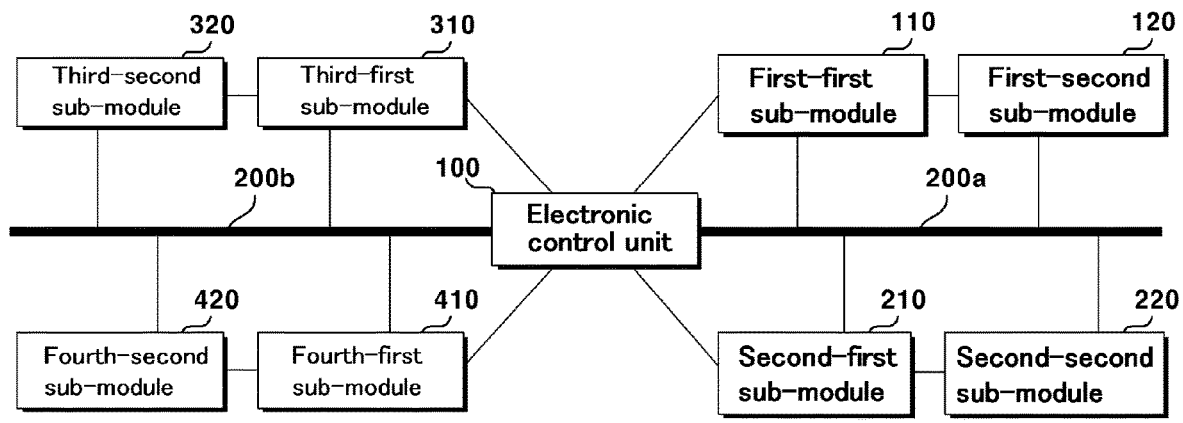
FIG. 4 is a block diagram illustrating a partial configuration of a vehicle inner communication system according to another embodiment.

FIG. 3 is a block diagram illustrating a partial configuration of a vehicle inner communication system according to an embodiment, and FIG. 4 is a block diagram illustrating a modified embodiment of a vehicle inner communication system according to an embodiment of FIG. 3.

In FIG. 3, a first-first sub-module to a first-fourth sub-module 110, 120, 130, and 140 and a second-first sub-module to a second-fourth sub-module 210, 220, 230, and 240 mean a plurality of electronic devices; a first-first sub-module to a first-fourth sub-module 110, 120, 130, and 140 mean a group of the same type of electronic device; and the second-first sub-module to the second-fourth sub-module 210, 220, 230, and 240 mean another group of the same type of electronic device. In addition, in FIG. 4, a 3-1 sub-module 310 and a 3-2 sub-module 320 mean a group of the same type of electronic device, and a 4-1 sub-module 410 and a 4-2 sub-module 420 mean another group of the same type of electronic device.

In addition, an electronic control unit is a device corresponding to the ECU of the vehicle, and will be described with reference to a control unit 100 for convenience of description below. In FIG. 3, the sub-module group is described based on the first module and the second module, but it is not limited thereto, and as illustrated in FIG. 4, more types of modules may be set, and the number of modules may also be variously changed.

Referring to FIG. 3, the control unit 100 may transmit and receive a communication signal to and from a first-first sub-module to a first-fourth sub-modules 110, 120, 130, and 140 and a second-first sub-module to a second-fourth sub-module 210, 220, 230, and 240 through two methods.

Specifically, the control unit 100 can communicate individually with each of the first-first sub-module to the first-fourth sub-module 110, 120, 130, and 140 and a second-first sub-module to a second-fourth sub-module 210, 220, 230, and 240, and at the same time, may perform communication separately and sequentially with a first-first sub-module to a first-fourth sub-module 110, 120, 130, and 140 and a second-first sub-module to a second-fourth sub-module 210, 220, 230, and 240 through serially connected communication lines.

Here, in the case of the bus communication line 200, CAN communication and RS-485 communication methods generally used inside the vehicle may be included; and in case of serial communication method, UART (universal asynchronous receiver/transmitter) communication method, RS-232 communication method, SPI communication method, I2C communication method, and the like may be included.

The control unit 100 should detect the status information of each module and perform control if necessary, and in general, the state of the modules can be detected using the BUS communication line 200.

And in this case, a separate setting is required for each module, and such information can be set using a communication line connected in series with the control unit 100.

Therefore, since the vehicle inner communication system according to an embodiment has such a configuration, the control unit 100 can perform dual communication in controlling the module, so there is an effect that can enhance the operational stability of the modules installed in a vehicle.

In addition, the control unit 100 may control various modules installed in the vehicle using the bus communication line 200, and in the case of bus communication lines, since it uses a common communication line 200 as indicated in the drawing, rather than using one individual line, so there is an advantage of being able to transmit a signal to each module simultaneously.

In addition, when communication is performed using bus communication, even if one module fails, this problem does not interfere with communication between other modules, so there is an advantage in that communication with other modules can be stably performed.

However, when communication is performed using only the bus communication line, due to the nature of bus communication, a predefined ID is required for each module, but when only the bus communication line is used, there is a problem that the position of the module must be fixed in response thereto.

However, in the case of the vehicle inner communication system according to an embodiment, it is possible to communicate with the module in a serial connection communication method separately from the bus communication method, and since the control unit 100 can determine the location of each module using communication and proceed with setting, the problem that the position of the module has to be fixed can disappear, and furthermore, there is an advantage that only one sub-module needs to be managed per module.

In addition, when performing communication using bus communication, there were many problems as the ID setting for each module had to be performed using bus communication, but in the case of a vehicle inner communication system according to an embodiment, since ID setting can be set using serially connected communication, ID setting can be performed more efficiently, and at the same time, there is also the effect that the location constraint for each module is removed.

In addition, a vehicle inner communication system according to an embodiment can continuously control the module even if a communication problem occurs in any one of the bus communication method and the serial communication method, so communication with each module can be performed using another communication method, and due to this, there is an advantage of obtaining a higher safety rating of the vehicle capable of stably operating various modules installed in the vehicle.

Figure 5:
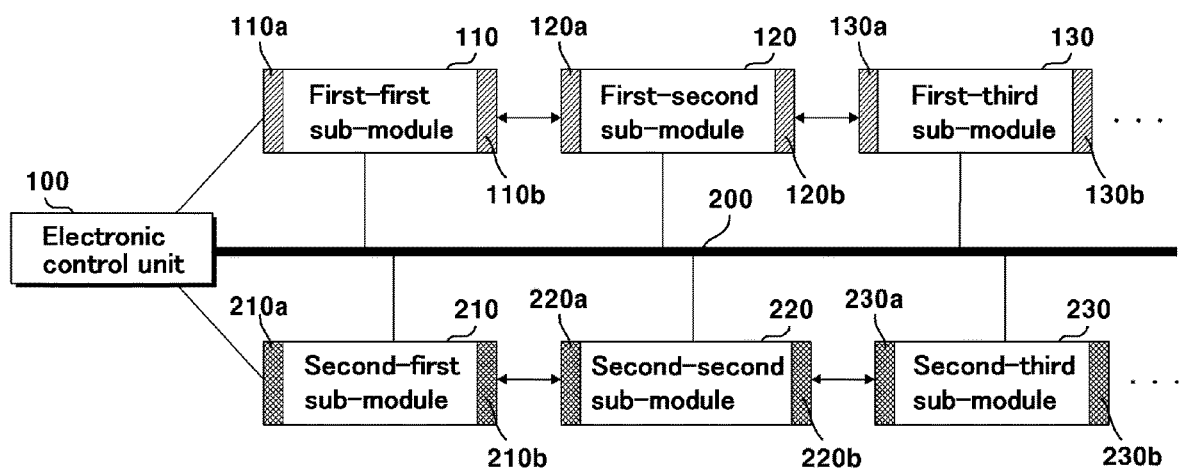
FIG. 5 is a block diagram illustrating a partial configuration of a vehicle inner communication system according to yet another embodiment.

FIG. 5 is a block diagram illustrating a partial configuration of a vehicle inner communication system according to yet another embodiment.

Referring to FIG. 5, a general structure and a method of performing communication are the same as those of FIG. 3, so overlapping portions will be omitted and characteristics between modules will be described.

The controller 100 according to an embodiment may set the same type of modules to a same group when setting the modules installed in the vehicle for each group. For example, in a DC-DC converter system, converters can be set to the same group; also in a battery management system, batteries can be set to the same group; and also in an oil circuit breaker (OCB) system, breakers and the like can be set to the same group, and in this case, modules of the same type can communicate with each other in the same way.

Specifically, as illustrated in FIG. 5, the receiving unit 110a in which the first-first sub-module 110 receives a signal from the control unit 100 and the transmitting unit 110b transmitting to the first-second sub-module 120 may be configured with the same type of communication interface. That is, the transmitting unit 110a of the first-first sub-module 110 and the receiving unit 110b; the transmitting unit 120a and the receiving unit 120b of the first-second sub-module 120; and the transmitting unit 130a and the receiving unit 130b of the first-third sub-module 130 may be configured with the same type of communication interface.

Similarly, the receiving unit 210a that the second-first sub-module 210 receives a signal from the control unit 100 and the transmitting unit 210b that transmits to the second-second sub-module 220 may be configured with the same type of communication interface. That is, the transmitting unit 210a and the receiving unit 210b of the second-first sub-module 210; the transmitting unit 220a and the receiving unit 220b of the second-second sub-module 220; and the transmitting unit 230a and the receiving unit 230b of the second-third sub-module 230 may be configured with the same type of communication interface.

In addition, in the case of having such a configuration, since the ID setting, which is a disadvantage of communication using bus communication of the prior art, can be effectively set using serial-connected communication, the effect of reducing the restrictions on the positional arrangement of the module may occur.

Up to now, the configuration and effects of a vehicle inner communication system have been studied through drawings.

In the case of a vehicle inner communication system according to the prior art, there was a problem that there was no way to accurately know when a problem occurred in a part of the connected communication line and communication is not established.

However, a vehicle inner communication system and vehicle including same according to an embodiment has an effect of reducing restrictions on arrangement positions of electronic devices by setting an ID to each of the electronic devices, which is a disadvantage of bus communication, by using serial-connected communication.

In addition, a vehicle inner communication system and vehicle including same according to an embodiment can continuously control electronic devices using another communication method even if operation is impossible due to a problem in one communication, and thus, there is an effect of achieving a higher safety rating for the vehicle by implementing dual communication from a functional safety point of view.

Although the embodiments have been described with reference to the limited embodiments and drawings up to now, various modifications and variations are possible from the above description by those skilled in the art. For example, the techniques described may be performed in a different order than the method described, and/or components of the described system, structure, device, circuit, and the like are combined or combined in a manner different from the described method, or even if replaced or substituted by other components or equivalents, appropriate results can be achieved. Therefore, other embodiments and equivalents to the claims also belong to the scope of the claims described below.

The invention claimed is:

1. A vehicle inner communication system comprising:
at least one of electronic device group provided in a vehicle; and
a control unit configured to detect and control electronic devices in the electronic device group by using a first communication method, which sends and receives signal individually with electronic devices in the electronic device group, and a second communication method, which sends and receives signal sequentially with electronic devices serially connected in the electronic device group,
wherein the first communication method uses a bus communication line which is connected to all electronic devices included in the electronic device group, and
wherein the second communication method uses communication lines through which electronic devices in the electronic device group are connected in series.

2. The vehicle inner communication system according to claim 1, wherein the first communication method comprises at least one of a controller area network (CAN) communication method or a recommended standard 485 (RS-485) communication method.

3. The vehicle inner communication system according to claim 1, wherein the second communication method comprises a method in which communication signals are sequentially transmitted through electronic devices serially connected.

4. The vehicle inner communication system according to claim 1, wherein the second communication method comprises at least one of a universal asynchronous receiver/transmitter (UART) communication method, a recommended standard 232 (RS-232) communication method, a serial peripheral interface (SPI) communication method, or an inter-integrated circuit, (I2C) communication method.

5. The vehicle inner communication system according to claim 1, wherein the control unit sets identifiers (IDs) to electronic devices in the electronic device group using the second communication method, and then detects and controls electronic devices in the electronic device group through the first communication method using the IDs that has been set.

6. The vehicle inner communication system according to claim 1, wherein the control unit detects location of electronic devices in the electronic device group using the second communication method.

7. The vehicle inner communication system according to claim 6, wherein the control unit detects location of one of electronic devices in the electronic device group using the serial second communication method.

8. The vehicle inner communication system according to claim 1, wherein in the electronic device group, electronic devices of a same type are grouped together.

9. The vehicle inner communication system according to claim 1, wherein electronic devices in the electronic device group transmit/receive signals to each other using a same type of communication method.

10. The vehicle inner communication system according to claim 1, wherein a transmitter and a receiver of electronic devices in the electronic device group comprise a same type of communication interface.

11. The vehicle inner communication system according to claim 1, wherein electronic devices comprise at least one of a DC-DC converter, a battery management system, or an oil circuit breaker (OCB).

12. The vehicle inner communication system according to claim 1, wherein the control unit detects and controls electronic devices using another communication method that is operating normally when a problem occurs in operation of any one of the first communication method or the second communication method.

13. The vehicle inner communication system according to claim 1,
wherein the electronic device group comprises a first electronic device group and a second electronic device group, and
wherein the control unit connects with all of electronic devices in the first electronic device group and electronic devices in the second electronic device group using the first communication method, and connects respectively with one of electronic devices in the first electronic device group and one of electronic devices in the second electronic device group using the second communication method.

14. A vehicle comprising:

at least one of electronic device group; and a control unit configured to detect electronic devices in the electronic device group and control operation thereof, by using a first communication method individually connected to electronic devices in the electronic device group and a second communication method by which electronic devices in the electronic device group are connected each other, wherein the first communication method uses a bus communication line which is connected to all electronic devices included in the electronic device group, and wherein the second communication method uses communication lines through which electronic devices in the electronic device group are connected in series.

15. The vehicle according to claim 14, wherein the control unit sets identifiers (IDs) to electronic devices in the electronic device group using the serial second communication method, and then detects and controls the electronic devices through the first communication method using the IDs that has been set.

16. The vehicle according to claim 14, wherein in the electronic device group, electronic devices of same type are grouped together.

17. The vehicle according to claim 14, wherein electronic devices in the electronic device group transmit/receive signals to each other using a same type of communication method.

18. The vehicle according to claim 14, wherein a transmitter and a receiver of electronic devices in the electronic device group comprise a same type of communication interface.

19. The vehicle according to claim 14, wherein the electronic devices comprise at least one of a DC-DC converter, a battery management system, or an oil circuit breaker (OCB).

20. The vehicle according to claim 14, wherein the electronic device group comprises a first electronic device group and a second electronic device group, and wherein the control unit connects with all of electronic devices in the first electronic device group and electronic devices in the second electronic device group using the first communication method, and connects respectively with one of electronic devices in the first electronic device group and one of electronic devices in the second electronic device group using the second communication method.

* * * * *